United States Patent [19]

Falaas et al.

[11] 3,998,654
[45] Dec. 21, 1976

[54] METHOD OF REMOVING ADHESIVE

[75] Inventors: Dennis O. Falaas, St. Paul, Minn.;
Joseph J. Whalen, Milwaukee, Wis.

[73] Assignee: Minnesota Mining and Manufacturing Company, St. Paul, Minn.

[22] Filed: Jan. 27, 1975

[21] Appl. No.: 544,391

Related U.S. Application Data

[63] Continuation-in-part of Ser. No. 437,160, Jan. 28, 1974, abandoned.

[52] U.S. Cl. .................................. 134/4; 134/6; 134/38
[51] Int. Cl.² .......................................... B08B 7/04
[58] Field of Search ............ 134/4, 6, 38; 252/163, 252/171, 172, 364, DIG. 8, 165, 166; 156/344

[56] References Cited

UNITED STATES PATENTS

| | | | |
|---|---|---|---|
| 1,812,322 | 6/1931 | Davidson | 252/DIG. 8 |
| 1,829,583 | 10/1931 | Davidson et al. | 252/DIG. 8 |
| 2,443,173 | 6/1948 | Baum et al. | 252/DIG. 8 |
| 2,495,729 | 1/1950 | Hutson et al. | 134/4 |
| 2,539,531 | 1/1951 | Clensos | 252/163 |
| 3,551,230 | 12/1970 | Hansen | 156/305 X |
| 3,654,940 | 4/1972 | Ritzi | 134/38 X |
| 3,681,251 | 8/1972 | Morison | 252/172 X |

FOREIGN PATENTS OR APPLICATIONS

| | | | |
|---|---|---|---|
| 493,765 | 10/1938 | United Kingdom | 252/165 |

*Primary Examiner*—S. Leon Bashore
*Assistant Examiner*—Marc L. Caroff
*Attorney, Agent, or Firm*—Alexander, Sell, Steldt & DeLaHunt

[57] ABSTRACT

Residual pressure-sensitive adhesive is removed from surfaces by applying a composition containing a swelling agent for the adhesive and a detackifying agent for the adhesive to the residual material, allowing the composition to remain in contact with the adhesive long enough to swell and detackify the adhesive, and then removing the adhesive, e.g. by rubbing, scraping or scouring with a cleaning tool. The remover compositions contain a swelling agent for the adhesive and a chemical detackifying agent selected from polyvalent metal-containing compounds or basic amines. The remover may also include a minor quantity of an organic acid, and/or a thickener for the remover composition such as a fumed silica or an organic resin.

8 Claims, No Drawings

METHOD OF REMOVING ADHESIVE

BACKGROUND OF THE INVENTION

This application is a continuation-in-part of our copending application Ser. No. 437,160, filed Jan. 28, 1974, now abandoned.

This invention relates to the removal of pressure-sensitive adhesives from substrates and surfaces.

Adhesives, particularly pressure-sensitive adhesives, are used for many applications such as on labels, tapes, and decorative sheets or films. Removal of these labels, tapes and decorative films from the substrate to which they have been applied frequently results in all or portions of the adhesive transferring to and remaining on the substrate surface; this transfer will often happen with aged adhesive coated materials. Clean and total removal of the residual adhesive from the surface of the substrate has been a problem with these adhesive materials. Heretofore, the adhesive was removed using organic solvent materials when a substrate would not be damaged by the solvent, or the adhesive was removed with abrasive materials, such as steel wool or sandpaper. The use of solvents to remove pressure-sensitive adhesives usually results in the adhesive becoming quite soft and tacky under the influence of the solvents, and when one rubbed the substrate with a cleaning tool such as a cloth or toweling, the adhesive smeared on the surface to leave a thin film of tacky adhesive on the surface of the substrate. This thin film of adhesive tends to stubbornly hold dirt that comes into contact with it. Also the adhesive which has softened and become even more aggressively tacky under the influence of the solvent is difficult to remove because of its tacky, aggressive, and stringy or "leggy" nature. Abrasive materials such as steel wool or sandpaper often are not acceptable methods of adhesive removal because of the tendency to scratch or dull the substrate surface. Also the abrasive material becomes quickly plugged with the adhesive, and this adhesive on the abrasive material surface will offset and contaminate other surfaces. A combination of solvent and abrasive material has been used to remove pressure-sensitive adhesives with the advantage that the solvent-softened, tacky adhesive is easier to remove from the surface with the abrasive material than with a cloth or toweling. However, this method suffers the disadvantages of the previous methods combined, i.e. that of adhesive smear which allows dirt collection on the substrate, and the scratching and dulling of the substrate surface.

It is an aim of this invention to provide a method and compositions which provide easier removal of certain pressure-sensitive adhesives by the swelling and detackification of those adhesives. It is a further aim of this invention to provide for the removal of pressure-sensitive adhesives that are formulated, compounded, or polymerized to contain active chemical functional groups in the adhesive, and to remove these adhesives without a tacky residual adhesive smear and to remove these adhesives without the problems caused by the tacky, aggressive, stringy nature of these adhesives when using organic solvents alone.

SUMMARY OF THE INVENTION

The present invention provides a method of removing from substrate surfaces residual tacky pressure-sensitive adhesives which contain reactive functional groups by the steps of:

a. applying to the residual adhesive a composition comprising a swelling agent for the adhesive and a chemical detackifying agent for the adhesive, the detackifying agent being selected from polyvalent metal-containing compounds in reactive form and strongly basic amines, b. allowing the composition to remain in contact with the adhesive for a time sufficient to swell and chemically detackify the residual adhesive, and c. removing the swollen and detackified adhesive with a cleaning tool.

The present invention also provides tacky pressure-sensitive adhesive remover compositions for use in the above-described method, the remover compositions comprising a combination of at least one organic swelling agent for the pressure-sensitive adhesive and a chemically detackifying material for the pressure-sensitive adhesive, the chemical detackifying agent being selected from polyvalent metal-containing compounds in reactive form and strongly basic amines.

DETAILED DESCRIPTION OF THE INVENTION

Pressure-sensitive adhesives that are formulated, compounded, or polymerized to contain certain active chemical functional groups may be detackified for easier removal with a remover composition containing a swelling agent for the adhesive and a chemical detackifier for the adhesive selected from polyvalent metal compounds in reactive form and strongly basic amines. The adhesive remover composition may contain an organic acid, and may be thickened with suitable inorganic or organic thickeners for easier application to vertical surfaces or for holding dispersed metal compounds in suspension in the remover composition. Lubricants such as oil or grease may be added to the remover composition for easier removal when a tool such as a plastic squeegee is used. The pressure-sensitive adhesives which may be detackified for removal include those having as functional groups the carboxylic acid, anhydride, amine, nitrile, epoxy, alcohol, and amide groups. An example of pressure-sensitive adhesive materials with certain of the just-mentioned active chemical groups are those disclosed and claimed in Ulrich U.S. Pat. No. 24,906, wherein certain non-tertiary acrylate esters are copolymerized with small proportions of additive copolymerizable monomers having strongly polar groups. Another example, Grunewalder U.S. Pat. No. 3,697,618, discloses a pressure-sensitive adhesive from the tacky interpolymer of certain alkyl acrylates, and certain vinyl esters, and "at least one copolymerizable alpha, beta-ethylenically unsaturated dicarboxylic acid or anhydride." The use of metals to react with active chemical groups present in polymers is well known in the industry; the ionomer type resins are based on this reaction. Metal compounds have also been used to cross-link or strengthen pressure-sensitive adhesives, see for example Sanderson et al, U.S. Pat. No. 3,740,366. See also "The Effects of Cross-Linking in Pressure-Sensitive Adhesives", *Aspects of Adhesion* — 4, D. J. Almer, Ed., CRC Press 1968, which discloses that polyacrylate ester copolymers which contain an active group may be cross-linked with polyamines or difunctional metallic oxides. However, as far as the applicant is aware, prior art adhesive remover compositions were primarily based on organic solvents, often with the addition of fillers such as Fuller's earth, and in spite of a long felt need for a good method of removing residual pressure-sensitive adhesives without smearing and without damage to the underlying substrate, no one had solved the problem of how to accomplish these aims.

In the practice of the present invention, the addition of an organic acid to the aforementioned solvent-metal compound adhesive remover sometimes improves the effectiveness of the adhesive remover; however, it is not an essential ingredient in the remover compositions of the present invention except where only insoluble polyvalent metal salts are present in which case the acid serves to at least partially form a soluble metal salt in the remover composition.

Swelling agents useful in the practice of the present invention include lacquer thinner; ketones such as acetone, methyl ethyl ketone, methyl isobutyl ketone, cyclohexanone, etc.; aromatic solvents such as xylene and toluene; commercial mixed aromatic solvent blends such as "Penola 150" and "Penola 100"; aliphatic esters such as ethyl acetate, isopropyl acetate, butyl acetate, amyl acetate, "Cellosolve Acetate" (ethylene glycol monoethyl ether acetate), and "Carbitol Acetate" (diethylene glycol monoethyl ether acetate); aliphatic hydrocarbons such as mineral spirits, heptane, etc.; and alcohols (in blends) such as ethanol, propanol, and butanol. In addition to the swelling effect on the adhesive, the choice of the swelling agent will be selected taking into consideration other properties such as volatility, odor, and its effect on the substrate, for example, whether or not the swelling agent will mar the substrate, e.g. if the substrate is a painted or lacquered surface.

Chemical detackifying agents useful in the practice of the invention are compounds which contain polyvalent metal, such as compounds containing molybdenum, zirconium, magnesium, calcium, strontium, barium, titanium, tin, iron, cobalt, nickel, copper, zinc, chromium and lead; and strongly basic amines such as ethylene diamine, and triethylene tetramine. The polyvalent metal containing compounds may be inorganic, e.g. cobalt chloride, zinc oxide, etc., or organometallic, e.g. cobalt octoate, zinc hexogen, zirconium naphthanate, etc.

It is generally preferred to select a detackifying material which is soluble in the swelling agent in order to achieve more rapid penetration of the detackifying material throughout the mass of the adhesive. However, dispersions of the detackifying material in conjunction with organic acids in the swelling agent have also been found to be useful.

The adhesive remover compositions may be thickened to provide easier application, especially to vertical surfaces. Also the thickeners are beneficial for remover compositions wherein the metal compound is in dispersion in the solvent or solvent blend, the thickeners retarding the settling of the metal compound. Suitable thickeners include the well-known inorganic thickening materials such as aluminum stearate and fumed silica, and organic resins such as those resins which provide thickening due to the dissolving or swelling of the resin in the organic liquid, or those resins which chemically react with the metal compound, such as carboxyl-containing resin. If desired, a combination of organic resin and inorganic thickeners may be used.

The adhesive remover composition may be applied to the adhesive by any desired technique, e.g. brushing or spraying. The remover is allowed to stand on the adhesive for a period sufficient to swell the adhesive and to effect chemical detackifying of the adhesive so that it has less tendency to smear and instead will be easier to remove from the substrate and from the cleaning tool. After standing on the adhesive (usually as little as 30 seconds up to 10 minutes is sufficient), the adhesive and any remaining remover composition is removed from the substrate surface with a cleaning tool. Cleaning tools include stiff bristle brushes, plastic squeegees, low density non-woven pads such as those made of nylon and other synthetic fibers, open mesh woven cloth, screening material, and similar scrubbing or scouring materials. The use of plastic or other abrasive-free cleaning tools is generally preferred because the possibility of scratching of the substrate surface is minimized. A small quantity of a lubricant such as an oil or grease may be added to the remover composition to reduce the drag on the cleaning tool during the removal operation.

The following examples, in which all parts are by volume unless otherwise indicated, illustrate adhesive remover compositions according to the invention.

Comparative Example A

A decorative marking film having a pressure-sensitive adhesive coating on one side of the film had been previously adhered to an aluminum panel. The adhesive was a copolymer of 90 parts of 2-methylbutyl acrylate and 10 parts of acrylic acid as disclosed and claimed in Ulrich, U.S. Pat. No. 24,906. The film was removed from the aluminum substrate using an organic solvent blend which softened the film and the underlying adhesive; this removal left a significant amount of residual adhesive on the panel. An attempt to remove one part of the residual adhesive was made using the solvent blend alone. Substantially complete removal of this portion of the adhesive had to be accomplished with the aid of a "Scotch-Brite" low density nylon pad which contained abrasive grain and which caused scratch marks on the aluminum panel.

EXAMPLE 1

A remover composition consisting of 95 parts of "Cellosolve Acetate" ("Cellosolve Acetate" is a trademark of Union Carbide Corporation for their brand of ethylene glycol monoethylether acetate), and 5 parts of copper naphthenate having a 4% metal content was prepared. The adhesive remover composition was applied to the remaining residual pressure-sensitive adhesive mentioned in the comparative example and allowed to remain thereon for about 5 minutes. This deadened the tack of the adhesive and allowed easy removal with the aid of a plastic squeegee, and without scratching of the aluminum substrate.

EXAMPLE 2

A pressure-sensitive adhesive remover of 90 parts of "Cellosolve Acetate", 5 parts of acetic acid, and 5 parts of copper naphthenate having a 4% metal content was prepared. A layer of the same acrylate adhesive as described in Comparative Example A was transfer coated onto an aluminum metal test panel and then baked at 90° C. for 5 days to simulate "ageing" of the adhesive layer. After application of the remover composition to the aged adhesive layer and allowing it to remain for about 10 minutes, the adhesive tack was deadened and removal with a plastic squeegee was easy without leaving any residual tacky smear. A mixture of 95 parts of "Cellosolve Acetate" and 5 parts of acetic acid alone did not deaden the adhesive and produced a "stringy" adhesive which was difficult to remove.

EXAMPLES 3 — 5

Adhesive remover compositions of the formulae described in Table I were prepared and evaluated on pressure-sensitive adhesive layers following the method as described in Example 2. Though all performed as adhesive removers, Example 3 worked better than Example 4, and Example 5 was not significantly better than Example 3.

Table I

|  | Example 3 | Example 4 | Example 5 |
| --- | --- | --- | --- |
| "Cellosolve Acetate" | 90 | 90 | 85 |
| Acetic acid | 5 | 5 | 5 |
| Copper naphthenate (8% metal) | 5 | — | 10 |
| Copper naphthenate (4% metal) | — | 5 | — |

EXAMPLES 6 — 8

Adhesive removers of the formulae as described in Table II were prepared and used to remove an adhesive layer, all as described in Example 2. Removers of Examples 6 and 7 gave essentially equal performance, but final clean up using a coarse weave cloth with the remover composition of Example 8 was easier. It is thought that the oleic acid behaves somewhat in the nature of a lubricant and aids final clean up.

Table II

|  | Example 6 | Example 7 | Example 8 |
| --- | --- | --- | --- |
| "Cellosolve Acetate" | 90 | 90 | 90 |
| Copper naphthenate (8% metal) | 5 | 5 | 5 |
| Acetic acid | 5 | — | — |
| Propionic acid | — | 5 | — |
| Oleic acid | — | — | 5 |

EXAMPLE 9

An adhesive remover composition was prepared using 225 parts of "Cellosolve Acetate" and 75 parts of isopropanol to which was added 20 parts of a saturated solution of cobalt chloride hexahydrate in ethanol. The use of the remover all as described in Example 2 provided much better removal of residual adhesive as compared to the use of prior art remover compositions as described in the Comparative Example.

EXAMPLE 10

A sample of residual adhesive obtained as in the Comparative Example was treated with a remover composition of 80 parts of "Cellosolve Acetate" and 20 parts of zinc hexogen with an 8% metal content. The pressure-sensitive adhesive was detackified and "rolled off" the panel on removal. The rolling or balling of a pressure-sensitive adhesive in conjunction with detackification provides for easier removal than if the adhesive becomes tacky and aggressive under the influence of the solvent.

EXAMPLE 11

A remover composition of 95 parts of "Cellosolve Acetate" and 5 parts of 8% cobalt octoate deadened the adhesive as described in Example 2 and allowed satisfactory removal of the adhesive with the use of a cleaning tool.

EXAMPLES 12 — 14

Further adhesive remover compositions were prepared as described in Table III. These compositions were used to remove adhesive from test panels all as described in Example 2. All of the compositions of Table III deadened the tack of the pressure-sensitive adhesive and allowed easy removal without adhesive smear.

Table III

|  | Example 12 | Example 13 | Example 14 |
| --- | --- | --- | --- |
| "Cellosolve Acetate" | 90 | 90 | 90 |
| Oleic acid | 5 | 5 | 5 |
| Molybdenum naphthenate (5% metal) | 5 | — | — |
| Zirconium naphthenate (6% metal) | — | 5 | — |
| Dibutyl tin dilaurate | — | — | 5 |

EXAMPLES 15 — 17

Adhesive remover compositions of the formulae described in Table IV were prepared to check for the solubility of the metal compound in the solvent or solvent blend and for detackification of an adhesive sample on a metal panel all as described in Example 2. In general, the polyvalent metal-containing compound in the amount indicated in Examples 12 — 14 was insoluble in 90 parts of "Cellosolve Acetate", but as shown in Table IV was soluble in a blend of "Cellusolve Acetate" and a mixed isomer blend of xylene. As noted above, the compositions containing dissolved metal-containing compounds are presently preferred over remover compositions in which the metal-containing compounds are in a dispersed form.

Table IV

|  | Example 15 | Example 16 | Example 17 |
| --- | --- | --- | --- |
| "Cellosolve Acetate" | 40 | 40 | 40 |
| Xylol | 50 | 50 | 50 |
| Oleic acid | 5 | 5 | 5 |
| 8% cobalt octoate | 5 | — | — |
| 10% zinc naphthenate | — | 5 | — |
| 6% manganese naphthenate | — | — | 5 |

EXAMPLE 18

An adhesion remover composition was prepared from the following formula in which all parts are parts by weight:

400 parts of "Cellosolve Acetate",
2 parts of an 86:13:1 vinyl chloride:vinyl acetate:dicarboxylic acid terpolymer ("Vinylite VMCH"),
2 parts of an 86:14 vinyl chloride:vinyl acetate copolymer ("Vinylite VYHH"),
16 parts of cyclohexanone,
15 parts of zirconium octoate (6% metal)
5 parts of glacial acetic acid,
4 parts of petrolatum, and sufficient Cabosil H-5 to give a thixotropic gel. The "Vinylite VMCH" and "VYHH" contributes to the thickening of the composition. This remover composition deadened the tack of the adhesive upon standing, and allowed easy removal of the adhesive all as described in Example 2.

EXAMPLE 19

A remover composition was prepared in which the parts are parts by weight:

| | |
|---|---|
| 20 | parts of a 35 weight percent "Vinylite VMCH", cyclohexanone solution, |
| 20 | parts of a 35 weight percent "Vinylite VYHH", cyclohexanone solution, |
| 100 | parts "Cellosolve Acetate", and |
| 15 | parts of zirconium octoate having a 6% metal content. |

This composition gave thixotropic gel whose viscosity could be controlled by the addition of an organic acid such as propionic acid. The composition was found to be an effective adhesive remover when tested all as described in Example 2.

EXAMPLE 20

20 grams of zinc oxide was dispersed in a mixture of 200 grams of "Cellosolve Acetate" and 5 grams glacial acetic acid. Sufficient Fuller's Earth was added to give a high viscosity paste. When applied to an adhesive layer as described in Example 2 and allowed to stand thereon, this composition deadened the tack and allowed removal of the adhesive with a cleaning tool. A similar paste prepared by replacing the zinc oxide with calcium hydroxide in the above formula also performed satisfactorily as a remover composition when utilized in the same manner. In contrast, if the acetic acid is omitted from either formulation, the composition does not chemically detackify the adhesive. It is felt that the acid contributes to chemical detackification by reaction with the insoluble metal salt to partially solubilize it.

EXAMPLE 21

A solution of a 94:6 2-ethylhexyl acrylate:acrylonitrile pressure-sensitive adhesive was coated onto a silicone release liner and dried relatively free of solvent. The coated adhesive film was transfer laminated to an aluminum panel which was then aged at 93° C. for 7 days. Application of the copper naphthenate containing remover composition of Example 3 detackified and softened the adhesive upon standing and allowed easy removal with a plastic squeegee cleaning tool.

EXAMPLE 22

Adhesive coated aluminum panels as described in Example 2 were prepared. Solutions of the following amines in a swelling agent were prepared where the solution was 97 parts of 2-butanone and 3 parts of the amine:ethylene diamine, triethylene tetramine, diphenyl amine, N-methyl morpholine, and aniline. These solutions were applied to the surface of the adhesive coated panels with a solution saturated cotton ball. The solution was allowed to remain on the adhesive for 1½ to 2 minutes before a second coat of solution was applied in the same manner. After allowing the second application to stand for an additional 1½ to 2 minutes, the tack of the adhesive was checked by pressing against the adhesive a thumb that had been rinsed in toluene. All solutions exhibited detackification of the adhesive surface. An additional coat of the amine solution was applied to the adhesive coated panel and immediately after, the adhesive was scraped with a plastic squeegee. The adhesive on the test panels "balled" when scraped with the squeegee. When most of the solvent had evaporated, the adhesive "balls" had significantly reduced tack. The strongly basic amines were the most effective, although each functioned to some degree adhesive remover. However, none appeared to work quite as efficiently as the polyvalent metal-containing compositions. Moreover, many amines are potential skin allergens and thus are less preferred where the removal process involves hand operations.

EXAMPLE 23

A solution of a 95:5 2-methylbutylacrylate:N,N-dimethyl-aminoethyl methacrylate pressure-sensitive adhesive was knife coated onto the release surface of a silicone coated release liner at a 0.01 cm. orifice. After drying the coated adhesive, it was laminated to aluminum panels and the resulting laminate was baked for a week at 93° C. The release liner was removed, and the exposed adhesive was treated with a composition of 25 parts of tetraisopropyltitanate in a blend of 25 parts of N-butanol and 50 parts of "Cellosolve Acetate". After standing for 5 to 10 minutes the adhesive was detackified and readily removed using a plastic squeegee. The same adhesive remover composition was applied to an aged aluminum test panel that was coated with a layer of a 96:4 isooctyl acrylate:acrylamide pressure-sensitive adhesive and served as an effective remover composition.

Because of its superior detackifying effect on the adhesives used in this example, the titanate-containing adhesive remover composition hereof is presently preferred for use in removal of these adhesives.

EXAMPLE 24

A thin layer of a 95:5 2-methylbutylacrylate:glycidyl-methacrylate pressure-sensitive adhesive was transfer coated on panels and aged for testing as in Example 23. A remover composition as described in Example 23 which contained tetra-isopropyltitanate was applied to the exposed adhesive, allowed to stand for 5 to 10 minutes, and the adhesive was then easy to remove with a cleaning tool.

Another test panel was treated with a remover composition consisting of 96 parts of toluene and 4 parts of cobalt octoate (8% metal). This composition also deadened the tack and allowed easy removal of the adhesive.

EXAMPLE 25

An aged test panel as described in Example 2 was treated with a remover composition consisting of 99 parts of toluene and 1 part of cobalt octoate (8% metal) with the treatment deadening the tack of the adhesive and allowing easy removal with a plastic squeegee. This treatment was repeated on another test panel using a toluene solution containing 0.5 parts of the same cobalt octoate, with the same results being observed. The first treatment had a total metal concentration of 0.08 percent cobalt, and the second treatment had 0.04 percent cobalt as metal. These treatments demonstrate that very little polyvalent metal is needed in the remover composition in order to deaden the tack of the adhesive. Because the remover composition is surface applied to the adhesive without a specific quantity, the amount of active metal can be very low and yet the remover composition will detackify the adhesive within a few minutes after application, and permit better and easier adhesive removal than that which was possible with the prior art methods and materials.

EXAMPLE 26

Adhesive remover compositions having the general formula of 90 parts of swelling agent, 5 parts of acetic acid and 5 parts of copper naphthenate (8% metal) were prepared and evaluated using the test panels and the method as described in Example 2. The respective swelling agents used in the general formula were: a mixed aromatic solvent blend ("Penola 150"), cyclohexanone, xylol, toluene, butryolactone and diethylene glycol monoethyl ether acetate. Each of the remover compositions was judged to be effective for use in the method of removing the adhesive from the test panels.

EXAMPLES 27 — 29

Adhesive remover compositions of the formulae as described in Table V were prepared and used to remove an adhesive layer, all as described in Example 2, and each was found to chemically detackify the adhesive and allow easy removal of the adhesive from the aluminum panel:

Table V

| | Example 27 | Example 28 | Example 29 |
| --- | --- | --- | --- |
| 60/40 Xylol/"VMP" naphtha | 95 grams | 95 grams | 95 grams |
| Ferric naphthenate | 5 grams | — | — |
| Lead octoate | — | 5 grams | — |
| Barium naphthenate | — | — | 5 grams |

Example 22 illustrates one method of quickly determining the detackification of the adhesive by the remover composition by wetting one's thumb with toluene and pressing it against the surface of the adhesive. Another method which may be employed, and which allows one without practicing the method of this invention, to distinguish between materials which might merely be physically detackifying the surface of the adhesive (as opposed to chemical detackification of residual adhesive) will now be described.

To the surface of the pressure-sensitive adhesive, such as that described in Example 2, one applies a solvent solution containing the proposed detackifying composition and allows it to soak from 30 seconds up to 5 minutes. A cotton ball is pressed firmly against the treated surface and pulled away. If no fibers remain the surface has been detackified. To distinguish between physical vs. chemical detackification, the adhesive surface is then wet with toluene. A fresh cotton ball is firmly rubbed against the surface and removed. If the adhesive has been chemically detackified, very few or no fibers will cling to the adhesive whereas if there has only been a physical detackification, a large number of fibers will remain. Where the claims herein recite that a material "chemically detackifies" an adhesive, it is meant that the material chemically detackifies according to the test described in the last three sentences.

As specific illustrations of the "cotton ball" test, a first solution composed of 5 grams of cadmium naphthenate in 120 grams of 60/40 xylol/heptane and a second solution containing 5 grams of manganese naphthenate in place of the cadmium naphthenate and a third solution in which 5 grams of aluminum stearate was substituted were applied and tested as just described. The panel tested with the first and third solutions retained a considerable number of cotton fibers whereas the panel tested with the second solution only retained a few fibers. The first and third solutions are not suitable to use in the practice of the invention whereas the second is.

Similarly, a first solution of 90 grams of "Cellosolve Acetate", 10 grams of zinc oxide and 5 grams of glacial acetic acid was compared to a second solution in which the acid was omitted. In the "cotton ball" test the first solution chemically detackified the adhesive as shown by the substantial lack of any fibers adhering to the toluene wet adhesive, whereas the adhesive treated with the second solution was reactivated by the toluene and a large number of fibers adhered thereto when rubbed with the cotton ball.

In the practice of the invention, remover compositions which employ chemical detackifying agents that are quite rapid in effecting detackification, and which in the amounts employed are substantially colorless so as not to discolor the work area are presently preferred. Thus, those remover compositions utilizing compounds of titanium, zirconium, zinc or iron are especially suitable, while colored compounds such as those utilizing chromium, copper, etc. are less preferred for use where discoloration of the work area would be objectionable.

While many of the remover compositions of the preceding examples do not contain a thickening agent, the inclusion of sufficient thickening agent to maintain the compositions in place when brushed onto a vertical surface is preferred because the emblems, decorative films, labels, etc. that leave the residual adhesive are often being removed from truck bodies, the sides of gasoline pumps, automobiles, etc. Often such emblems or labels comprise vinyl or other plastic films, and initially the film is softened or loosened by application of a "film remover" composition comprising an organic solvent blend. Even though these film removers allow stripping away of the film, the prior art had not found as satisfactory a method for removal of the residual pressure-sensitive adhesive as is provided by the present invention.

What is claimed is:
1. A method for removing from substrate surfaces residual tacky pressure-sensitive adhesive containing reactive functional groups selected from the group consisting of carboxylic acid, anhydride, amine, nitrile, epoxy, alcohol, and amide functional groups, said method consisting essentially of the steps of:
   a. applying to the residual adhesive a nonaqueous composition comprising a swelling agent for the adhesive in an amount sufficient to swell the adhesive and a polyvalent metal-containing chemical detackifying agent in an amount sufficient to chemically detackify the adhesive, said chemical detackifying agent being dissolved in the swelling agent whereby it is reactive with said reactive functional groups to thereby accomplish said chemical detackifying;
   b. allowing the composition to remain in contact with the adhesive at ambient temperature for a time sufficient to swell and detackify the residual adhesive, and
   c. removing the swollen and detackified adhesive with a cleaning tool.

2. A method according to claim 1 in which the adhesive remover composition includes sufficient thickening agent to maintain the composition substantially in place when brushed upon a vertical surface.

3. A method according to claim 1 in which the adhesive remover composition includes as a swelling agent ethylene glycol monoethyl ether acetate and the chemical detackifying material is a polyvalent metal-containing compound.

4. A method according to claim 3 in which the said metal-containing compound is an organometallic compound.

5. A method according to claim 4 in which the polyvalent metal in said organic compound is selected from zirconium, titanium, zinc and iron.

6. A method according to claim 1 in which the adhesive remover composition includes an organic acid.

7. A method according to claim 1 in which the residual pressure-sensitive adhesive comprises a polymer of an alkyl acrylate copolymerized with acrylic acid.

8. A method of claim 1 in which said pressure-sensitive adhesive comprises a polymer that includes acrylate monomers.

* * * * *